United States Patent
Shigemi et al.

(10) Patent No.: US 6,336,060 B1
(45) Date of Patent: Jan. 1, 2002

(54) ARITHMETIC PROCESSING METHOD AND SYSTEM IN A WIDE VELOCITY RANGE FLIGHT VELOCITY VECTOR MEASUREMENT SYSTEM USING A SQUARE TRUNCATED PYRAMID-SHAPE FIVE-HOLE PITOT PROBE

(75) Inventors: Masashi Shigemi, Tokyo; Teruomi Nakaya, Machida; Shigemi Shindo, Wako; Minoru Takizawa, Hino; Takeshi Ohnuki, Mitaka, all of (JP)

(73) Assignee: National Aerospace Laboratory of Science and Technology Agency, Tokyo (JP)

( * ) Notice: Subject to any disclaimer, the term of this patent is extended or adjusted under 35 U.S.C. 154(b) by 0 days.

(21) Appl. No.: 09/661,411

(22) Filed: Sep. 13, 2000

(30) Foreign Application Priority Data

Feb. 25, 2000 (JP) .......................... 12-049666

(51) Int. Cl.⁷ .............................................. G01C 21/10
(52) U.S. Cl. ............................... 701/7; 701/1; 244/177; 244/180; 73/147; 73/183; 702/45
(58) Field of Search .......................... 701/7, 1; 73/183, 73/182, 147; 244/177, 180, 181, 182; 702/45

(56) References Cited

U.S. PATENT DOCUMENTS 5,423,209 A    6/1995   Nakaya et al.
5,756,891 A    5/1998   Nakaya et al.
5,866,813 A    2/1999   Nakaya et al.
6,176,130 B1   1/2001   Nakaya et al. .........................

Primary Examiner—William A. Cuchlinski, Jr.
Assistant Examiner—Olga Hernandez
(74) Attorney, Agent, or Firm—Armstrong, Westerman, Hattori, McLeland & Naughton, LLP

(57) ABSTRACT

An arithmetic processing method and system in a wide velocity range flight velocity vector measurement system using a square truncated pyramid-shape five-hole Pitot probe. Approximation equations that determine attack angle $\alpha$ and sideslip angle $\beta$ in the form of third-order equations concerning attack angle pressure coefficient $C\alpha$ and sideslip angle pressure coefficient $C\beta$, which are known numbers, are expressed in the form of a polynomial equation concerning Mach number M, where the coefficients are obtained from a lookup table. Coefficient calculations in the polynomial equation, and attack angle a and sideslip angle $\beta$, calculations may be performed as simple calculations by specifying and applying known numbers into the approximation equation without solving third-order equations, with calibration coefficients that form the basis of coefficient calculation with the polynomial equation first being stored in memory in advance as a table for each wide velocity range on the basis of wind tunnel testing. A Mach number may be calculated instantly from a lookup table by specifying Mach pressure coefficient CM and angle to airflow pressure coefficient $C\gamma$. Wide velocity range flight velocity vector measurement with a high update rate which is capable of real time response in flight control as demanded by aircraft is obtained.

5 Claims, 6 Drawing Sheets

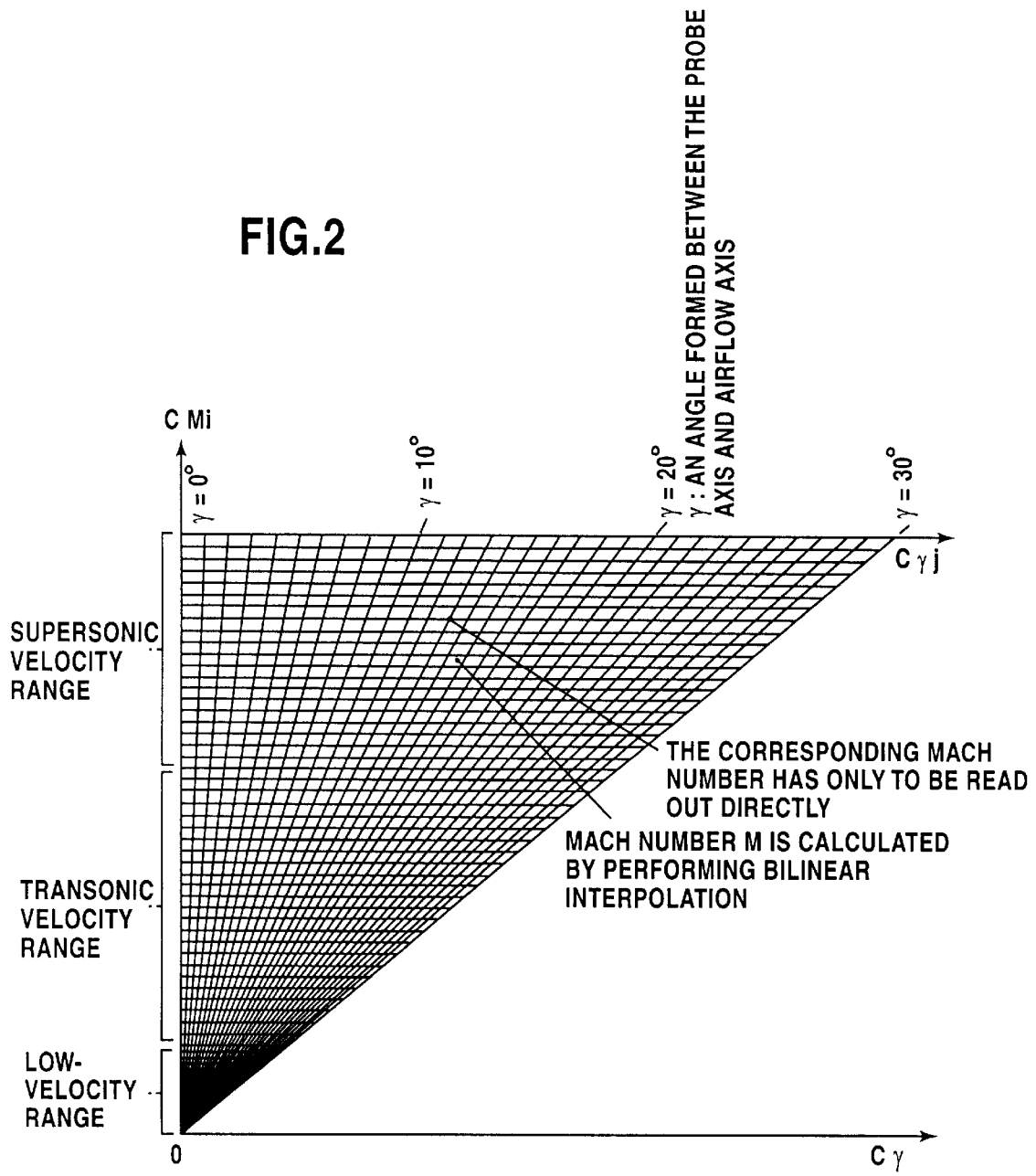

THE RELATIONSHIP BETWEEN ATTACK ANGLE PRESSURE COEFFICIENT C $\alpha$ AND REAL AIRFLOW ATTACK ANGLE $\alpha$ THE RELATIONSHIP BETWEEN SIDESLIP ANGLE PRESSURE COEFFICIENT C $\beta$ AND REAL AIRFLOW SIDESLIP ANGLE $\beta$

A SIMPLIFIED FLOWCHART OF MEASUREMENT

Pb1 (PRESSURE GROUP 1)
PH (TOTAL PRESSURE)
Pb2 (PRESSURE GROUP 2)
Pb4 (PRESSURE GROUP 4)
Pb3 (PRESSURE GROUP 3)

ARITHMETIC PROCESSING METHOD AND SYSTEM IN A WIDE VELOCITY RANGE FLIGHT VELOCITY VECTOR MEASUREMENT SYSTEM USING A SQUARE TRUNCATED PYRAMID-SHAPE FIVE-HOLE PITOT PROBE

BACKGROUND OF THE INVENTION

1. Field of the Invention

The present invention relates to an arithmetic processing algorithm for flight velocity vector measurement of a wide velocity range that extends from low velocities to supersonic velocities and to a system using said algorithm.

2. Description of the Related Art

The present applicant previously invented and obtained a patent for (U.S. Pat. No. 5,423,209; Japanese Patent No. 2913005) a flight velocity vector measurement system using a square truncated pyramid-shape five-hole Pitot probe as in FIG. 6. FIG. A is a front view. FIG. B is a partial side sectional view. As in FIG. A, a group of pressure holes having a total pressure hole in the center thereof is provided on each of the four slanted sides of the pyramid shape. The patented invention is a flight velocity vector detection system using a multi-side truncated pyramid shape Pitot probe wherein an extreme end portion has a multi-side truncated pyramid shape, a shield hole is provided at the apex thereof, a total pressure tube of a smaller diameter than that of the shield hole is secured at a position by a predetermined length determined by a relationship with the diameter of the shield hole from the extreme end of the shield hole; wherein pressure information detected by said multi-side truncated pyramid shape Pitot probe on each side thereof are positioned pressure holes is input to a velocity vector arithmetic processor to convert said information into electronic signals, which are processed using pressure coefficients of the pressure holes of said probe with respect to velocity vector, said pressure coefficients being stored in advance in a memory, to calculate flight velocity vector (V, α, β) with respect to the probe axis from the pressure information and air density; wherein an output of an attitude azimuth reference device is input to said velocity vector arithmetic processor and information from the attitude azimuth reference device is connected with flight velocity vector information with respect to said airframe axis to calculate flight velocity vector. Adoption of such a configuration enables a single square truncated pyramid shape Pitot probe and an arithmetic processor to perform the respective functions of a conventional airspeed indicator, altimeter, rate of climb indicator, Mach meter, and yaw meter, thereby making it possible to reduce the number of detection devices; to connect the various information and output and display said information; and to provide a pilot with highly reliable atmospheric information. Furthermore, a limited effect of pressure coefficients caused by variation in velocity eliminates the need to perform complex correction, making it possible to obtain velocity vector information with good accuracy and over a wide angular range and facilitating installation, without the need for an advanced computer, in a wide range of aircraft, from ordinary aircraft, including helicopters and other vertical takeoff and landing aircraft, to supersonic aircraft that are accompanied by shock waves. In addition, [the patented invention] is a groundbreaking invention offering many superior effects, namely, being less influenced by the pressure coefficients caused by variation of velocity of those pressure holes that detect wind direction, requiring no complicated correction, being able to obtain velocity vector information with good accuracy and over a wide angular range, and posing no likelihood of defective measurement due to clogging, vibrations and the like.

Arithmetic processing method's concerning Mach number M (or velocity V) stored in ROM form and used in an arithmetic processor for a flight velocity vector measurement system that uses a square truncated pyramid-shape five-hole Pitot probe comprise (1.) those in which said five-hole probe is not subjected to compression and which are suitable for low-velocity ranges not requiring high-speed arithmetic processing and (2.) those suitable for a wide range of velocities that extends from low velocities to supersonic velocities accompanied by shock waves. The former, namely (1.) arithmetic processing for low-velocity ranges in which said five-hole probe is not subjected to compression, is a processing technology wherein the Newton-Raphson method ("N-R method") is used and wherein three parameters comprising attack angle α, sideslip angle β, and velocity (dynamic pressure q) are determined, by repeated calculation, using pressure calibration coefficients concerning attack angle, sideslip angle, and velocity calculated in advance. Said technology is disclosed in the Specifications of the said patented invention and has been implemented in the HOPE Automatic Landing Flight Experiment (ALFLEX) demonstration vehicle and in NAL experimental vehicles.

Regarding the latter, namely (2.) arithmetic processing methods for a wide range of velocities that extends from low-velocity flight to supersonic-velocity flight in which said five-hole probe is subjected to shock waves, flight velocity vector arithmetic processing equations that were also developed by the present applicant and in which five items of pressure information are used as basic data and Mach number M is first determined by some processing method and then used determine angle have been presented (U.S. Pat. No. 2884502, "Wide Velocity Range Flight Velocity Vector Measurement System Using a Square Truncated Pyramid-Shape Five-Hole Probe"). This technology has been used in airflow measurement in supersonic wind tunnels.

The flight velocity vector calculation methods for the aforesaid (2.) comprise two methods. One is a system wherein a Mach number equation and angle equations are solved directly in third-order polynomial approximation equations for each segmented velocity range; the other, a lookup table system that omits the solution of a third-order equation for intermediate calculation of the Mach number and wherein Mach number is read directly from a Mach number table created in advance by calculating Mach number M from airflow angle pressure coefficient and Mach pressure coefficients determined in advance. Within the former system for solving Mach number M and angles with third-order equations, Mach number calculation, wherein angle to airflow pressure coefficient Cγ is obtained in advance by further processing Mach pressure coefficient CM, which is obtained by making a pressure difference between a total pressure and average pressure of four holes in the square truncated pyramid surfaces obtained by processing the five items of pressure information detected by said five-hole probe nondimensional according to said total pressure, and wherein pressure coefficients Cα and Cβ are also obtained in advance by making a vertical pressure difference and transverse pressure difference among the four holes in the square truncated pyramid surfaces nondimensional according to total pressure, is specified using pressure calibration coefficients determined in advance for each velocity range in conjunction with determination of segmented velocity ranges, said velocity ranges being determined from the aforesaid pressure coefficient CM, and the aforesaid angle to airflow pressure coefficient Cγ. Mach number M is arrived at by solving said third-order equations for each velocity region to determine an appropriate root. Angles are arrived at by similarly solving a third-order arithmetic processing equation concerning angle α and angle β using aforesaid pressure coefficients Cα and Cβ and the pressure calibration coefficient corresponding to the angle. The arithmetic processing equation used to calculate Mach number, angle α, and angle β are all third-order equations, each having three roots (with said roots comprising either three real roots or one real root and two imaginary roots), and so selection of an appropriate root entails using complicated determination methods.

The other method, namely the lookup table method, is a method wherein, without using a third-order equation in Mach number determination, Mach pressure coefficient CM and angle to airflow pressure coefficient Cγ are first obtained from preset Mach number M, which can be obtained during calibration wind testing in which the aforesaid five-hole probe is placed in a wind tunnel, and from five items of pressure information obtained for each setting of the probe's angle α and angle β (i.e., the probe's preset angle value for the airflow axis); wherein, using three parameters comprising said Mach number M, angle to airflow pressure coefficient Cγ, and Mach pressure coefficient CM, a lookup table (FIG. 5) that graphs Mach number M on an orthogonal plane having angle to airflow coefficient Cγ as its horizontal axis and Mach pressure number CM as its vertical axis is comprised; and wherein Mach number M can be directly determined by applying the aforesaid angle to airflow pressure coefficient Cγ and Mach pressure coefficient CM. This lookup table, as shown in FIG. 5, is divided into separate sections for each velocity range. Furthermore, attack angle α and sideslip angle β, which are airflow angles, are calculated with a method wherein a third-order equation concerning attack angle α is established using a Mach number M that is obtainable from the lookup table, an attack angle pressure calibration coefficient $A_{ij}$ calculated in advance, and the aforesaid Mach pressure coefficient Cα; wherein a third-order equation concerning sideslip angle β is similarly established in the aforesaid Mach number M, a sideslip angle β pressure calibration coefficient $B_{ij}$ calculated in advance, and the aforesaid Mach pressure coefficient Cβ; and wherein said third-order equations are solved directly to select the appropriate root, thereby determining attack angle a and sideslip angle β. This method, although simplifying calculation of Mach number M by use of a table system, requires solving and interpreting of third-order equations in the calculation of airflow angles of attack angle α and sideslip angle β.

Generally, an arithmetic processor in a flight velocity vector measurement system that is loaded on aircraft capable of flying at wide range of velocities, from low velocities to supersonic velocities, has a configuration that includes a pressure converter, CPU, ROM, interface and the like and must be compact, lightweight, and resistant to electromagnetic environments and have high accuracy in the form of high reliability and sophisticated arithmetic processing capabilities. Furthermore, arithmetic processing signals must be obtainable in real time so as to be introduced into externally connected avionics and flight control devices and thereby facilitating active control with respect to atmospheric disturbance. Hence, arithmetic processing requiring solving of third-order equations by an existing arithmetic processor in the aforesaid flight velocity vector measurement system is inadequate, and a method that makes possible new, high-accuracy, high-speed arithmetic processing is required. Incidentally, application of the aforesaid technology (1.), as said technology essentially uses the N-R method, requires increasing the number of repeated calculations in order to increase measurement accuracy and is an unsuitable method with respect to securing a high update rate because of the difficulty of high-speed processing. In addition, technology (2.), as already stated, although simplifying calculation of Mach number M by using a table system, requires solving of third-order equations to calculate airflow angles α and β. In particular, limitations exist with respect to direct solving of the polynomial approximation equation (third-order equation) used to increase accuracy, in that because [said equation], being a third-order equation, has three roots (with said roots comprising either three real roots or one real root and two imaginary roots), determination of the appropriate root requires a complicated determination algorithm, whereas loosening of criteria leads to problems with measurement accuracy. Thus, limitations exist with respect to obtaining high accuracy and a high update rate. Therefore, a new arithmetic processing method capable of ensuring high reliability, high accuracy, and a high update rate has been desired for flight velocity vector measurement systems applicable even in supersonic aircraft.

SUMMARY OF THE INVENTION

An object of the present invention is to solve the above-mentioned problems, namely, to provide an arithmetic processing algorithm that, in a wide velocity range that extends from low velocities to supersonic velocities and in a flight velocity vector measurement system employing a square truncated pyramid-shape five-hole Pitot probe, is capable of arithmetically processing, with high accuracy and high update rate, a flight velocity vector that indicates velocity extent and airflow angle and a static pressure that indicates altitude; and to provide a flight vector measurement system that, being compact, lightweight, and resistant to electromagnetic environments and having high accuracy in the form of high reliability and sophisticated arithmetic processing capabilities, is capable of arithmetically processing the aforesaid algorithm with high accuracy and a high update rate in an arithmetic processing apparatus.

The arithmetic processing method of the present invention that resolves the above-mentioned problems expresses approximation equations that determine attack angle α and sideslip angle β in the form of third-order equations concerning attack angle pressure coefficient Cα and sideslip angle pressure coefficient Cβ, which are known numbers; is expressed the form of a polynomial equation concerning Mach number M that is capable of instantly calculating said coefficients from a lookup table; enables coefficient calculations in said polynomial equation and calculation of attack angle α and sideslip angle β to be performed as simple calculations by specifying and applying a known number into the approximation equation without solving a third-order equation as is done conventionally, with calibration coefficients that form the basis of coefficient calculation with the polynomial equation first being stored in memory in advance as a table for each wide velocity range on the basis of wind tunnel testing; enables a Mach number to be calculated instantly from a lookup table by specifying Mach pressure coefficient CM and angle to airflow pressure coefficient Cγ; permits wide velocity range flight velocity vector measurement with a high update rate; and is capable of real time response in flight control as demanded by aircraft.

BRIEF DESCRIPTION OF THE DRAWINGS

The present invention is described with the attached drawings.

FIG. 2 is a simplified grid diagram of the Mach number calculation lookup table.

DESCRIPTION OF THE PREFERRED EMBODIMENTS

Figure 1:
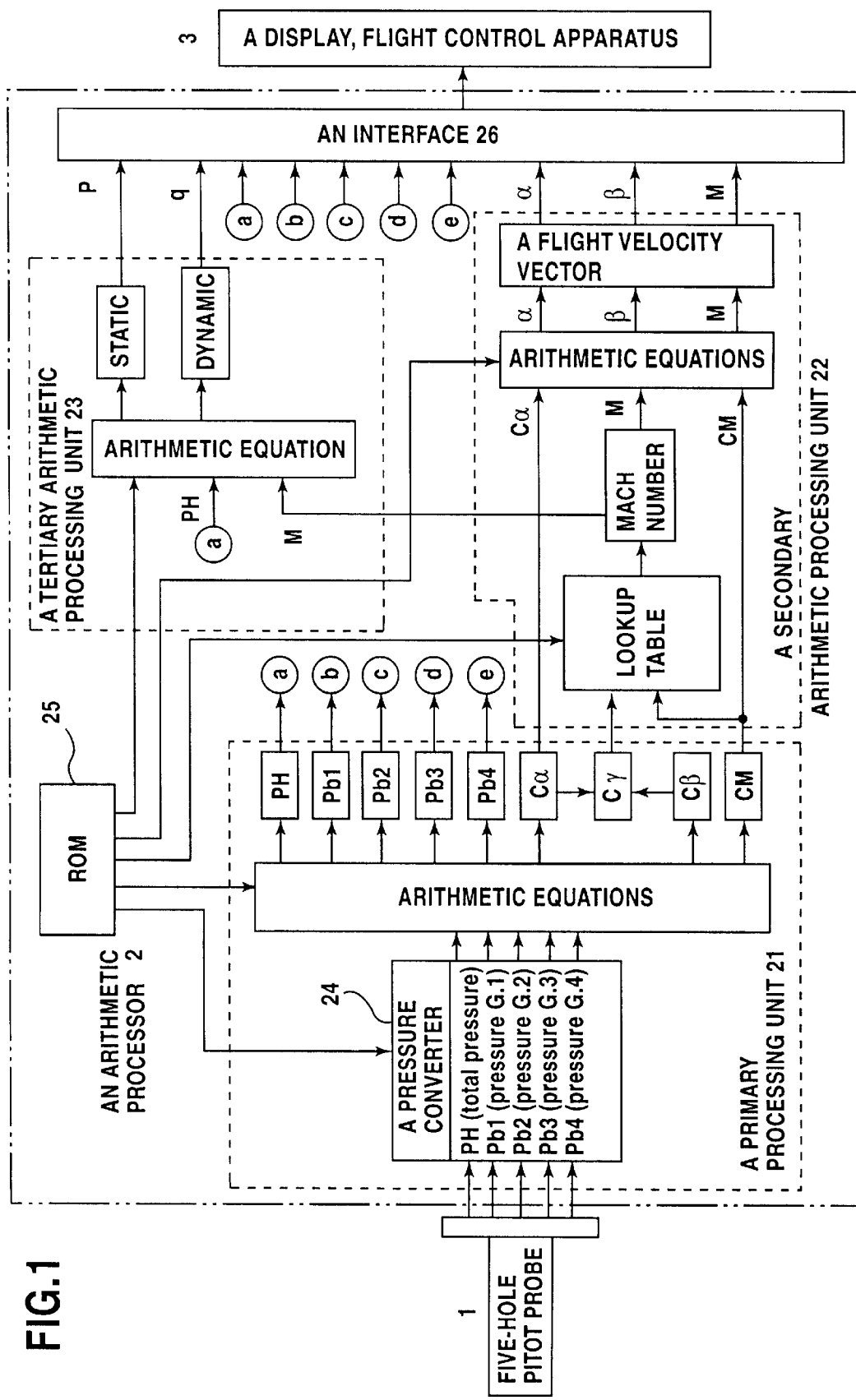
FIG. 1 is a simplified block diagram of arithmetic processing of an arithmetic processor.
Figure 6A:
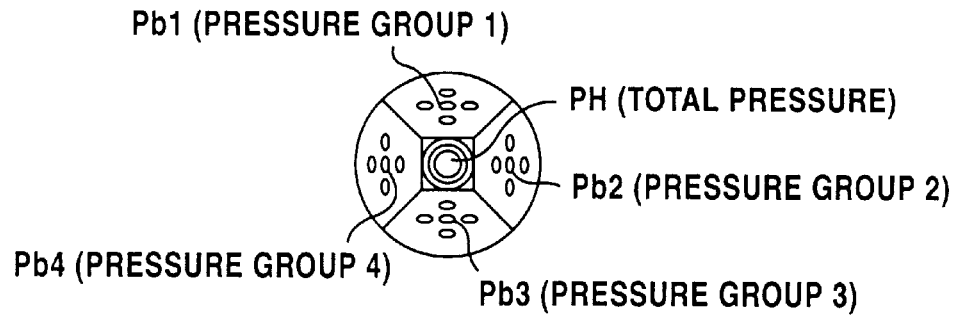
FIG. 6 is a drawing showing an example structure of a five-hole probe.
Figure 6B:
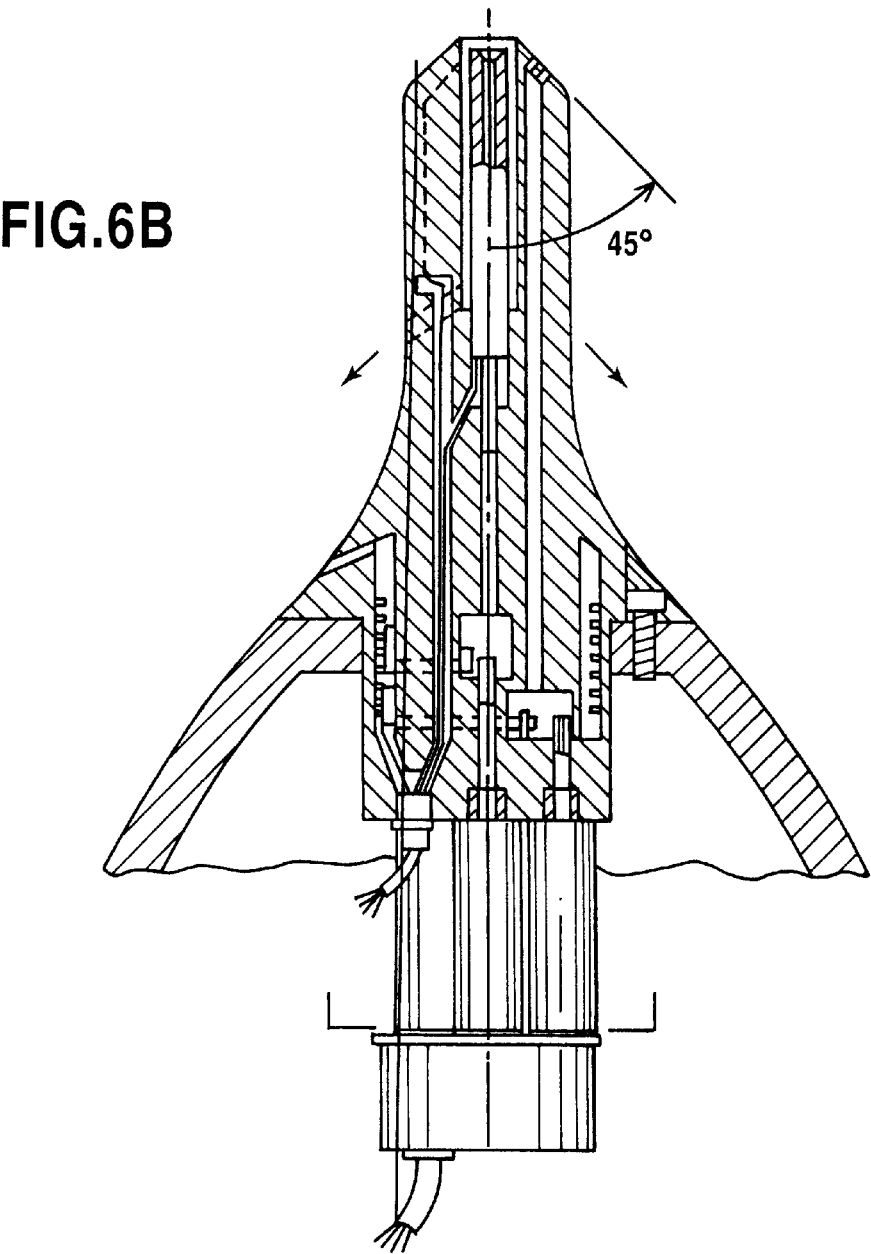

An overview of the arithmetic processing system in the present invention is given using the arithmetic processing block diagram (FIG. 1). The present invention receives five items of pressure information (total pressure: PH, pressure group 1: Pb1, pressure group 2: Pb2, pressure group 3: Pb3, and pressure group 4: Pb4) detected during flight across a wide range of velocities, from low velocities to supersonic velocities, from a five-hole probe 1 as shown in FIG. 6; accurately and in real time calculates and transmits to a display apparatus, flight control apparatus, and the like 3 a flight vector (M, $\alpha$, and $\beta$), static pressure p, and dynamic pressure q; and so concerns an arithmetic algorithm, and the concretization thereof, that is used in an arithmetic processor 2 of a flight velocity vector measurement system. The aforesaid five detected items of pressure information are first introduced into an arithmetic processor 2 of the aforesaid flight velocity vector measurement system, which comprises a pressure converter 24, a CPU not shown in the drawing, a memory (ROM 25) and the like. Pressure signals are converted to electric signals and input into a work area of the CPU. Primary arithmetic processing is carried out, obtaining airflow attack angle pressure coefficient C$\alpha$ by substituting a pressure difference (Pb1−Pb3) detected by vertical pressure holes in the aforesaid five-hole probe into equation 1 to nondimensionalize [said pressure difference] by dividing by a total pressure PH detected in the center; airflow sideslip angle pressure coefficient C$\beta$ by similarly substituting a pressure difference (Pb2−Pb4) detected by horizontal pressure holes into equation 2 to nondimensionalize [said pressure difference] by dividing by total pressure PH detected in the center; angle to airflow pressure coefficient C$\gamma$, said angle being the angle of an airflow with respect to the axis of said five-hole probe; and Mach pressure coefficient CM by similarly substituting a pressure difference between total pressure PH and average pressure of four holes in the square truncated pyramid surfaces into equation 4 to nondimensionalize [said pressure difference] by dividing by total pressure PH detected in the center. This processing is performed in a primary processing unit 21, which is enclosed by a broken line in FIG. 1.

$$C\alpha=(Pb1-Pb3)/PH \quad (1)$$

$$C\beta(Pb2-Pb4)/PH \quad (2)$$

$$C\gamma=\sqrt{C\alpha^2+C\beta^2} \quad (3)$$

$$CM=\{PH-(Pb1+Pb2+Pb3+Pb4)/4\}/PH \quad (4)$$

Figure 5:
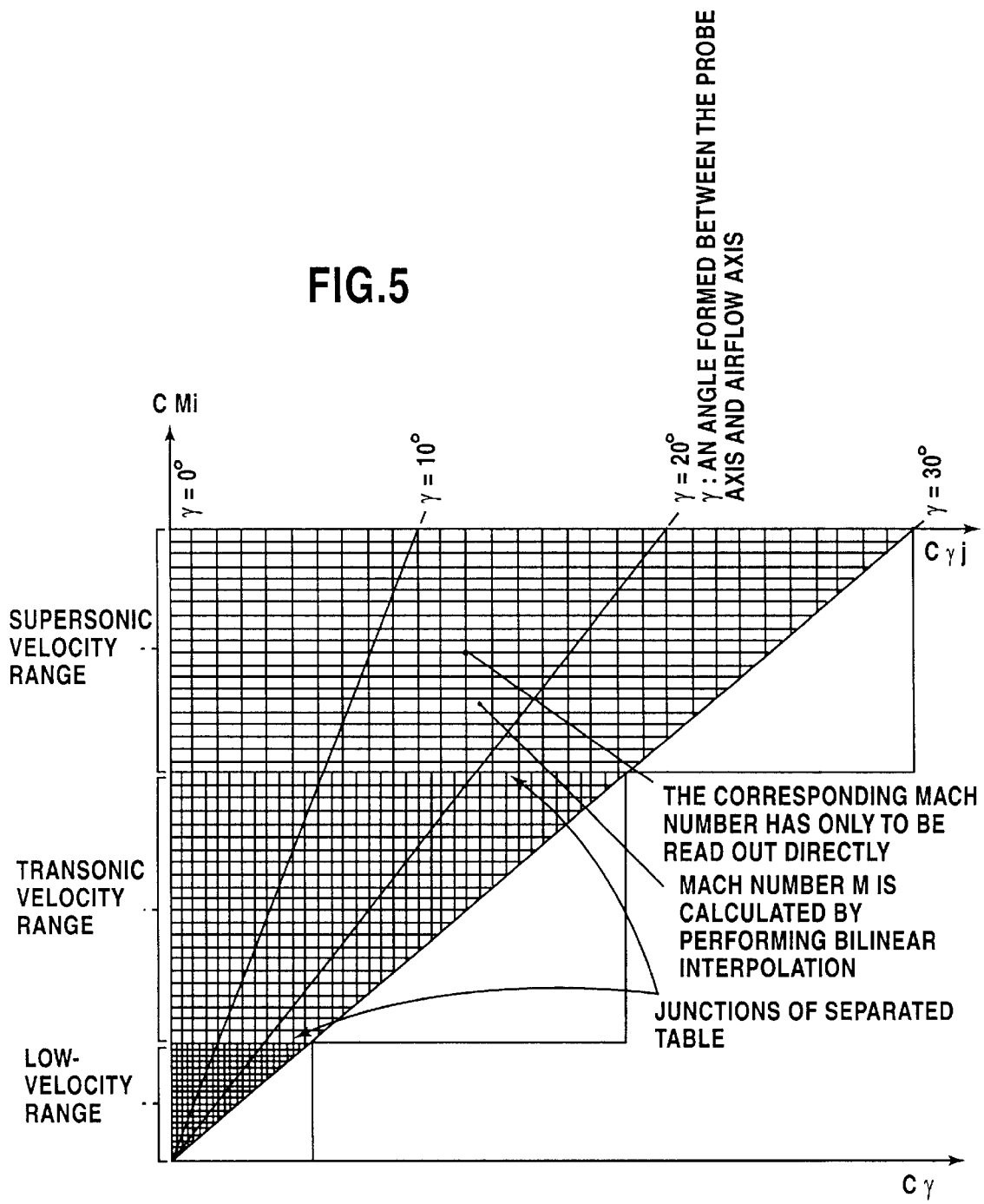
FIG. 5 is a simplified grid diagram (i.e., orthogonal coordinate system) of a Mach number calculation lookup table of a conventional system.

In the present invention, values of Mach number M for a wide range of velocities are stored in advance in ROM or some other memory means so that Mach number can be determined according to a graph of the relationship between a Mach pressure coefficient CM and angle to airflow pressure coefficient C$\gamma$ both obtained with equations 3 and 4 based on information detected in a wind tunnel by the aforesaid five-hole probe at various settings for Mach number and probe angle with respect to airflow axis; in actual measurement, the Mach pressure coefficient CM and angle to airflow pressure coefficient C$\gamma$ obtained from the aforesaid primary arithmetic processing are specified in this Mach number lookup table to determine a Mach number. The relationship between this Mach pressure coefficient CM and angle to airflow pressure coefficient C$\gamma$, as shown in FIG. 5 and FIG. 2, is such that when angle $\gamma$ between the probe axis and airflow axis is zero, the angle to airflow pressure coefficient C$\gamma$ is constantly zero regardless of the value of Mach pressure coefficient CM, which is therefore at C$\gamma$=on the aforesaid graph. The relationship between the two [coefficients] is that of a first-order equation through an origin, and is such that as angle $\gamma$ between the probe axis and airflow axis increases, incline lessens.

Figure 3A:
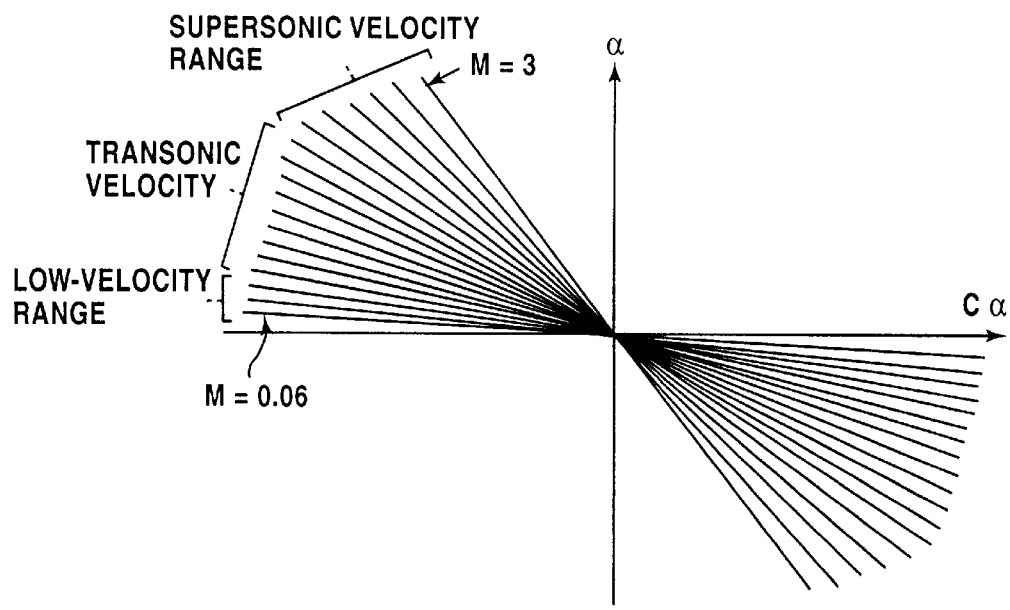
FIG. 3 is a graph indicating the relationship between actual airflow angle and the pressure coefficients used in determination of pressure calibration coefficients concerning angles; A concerns attack angle, B concerns sideslip angle.
Figure 3B:
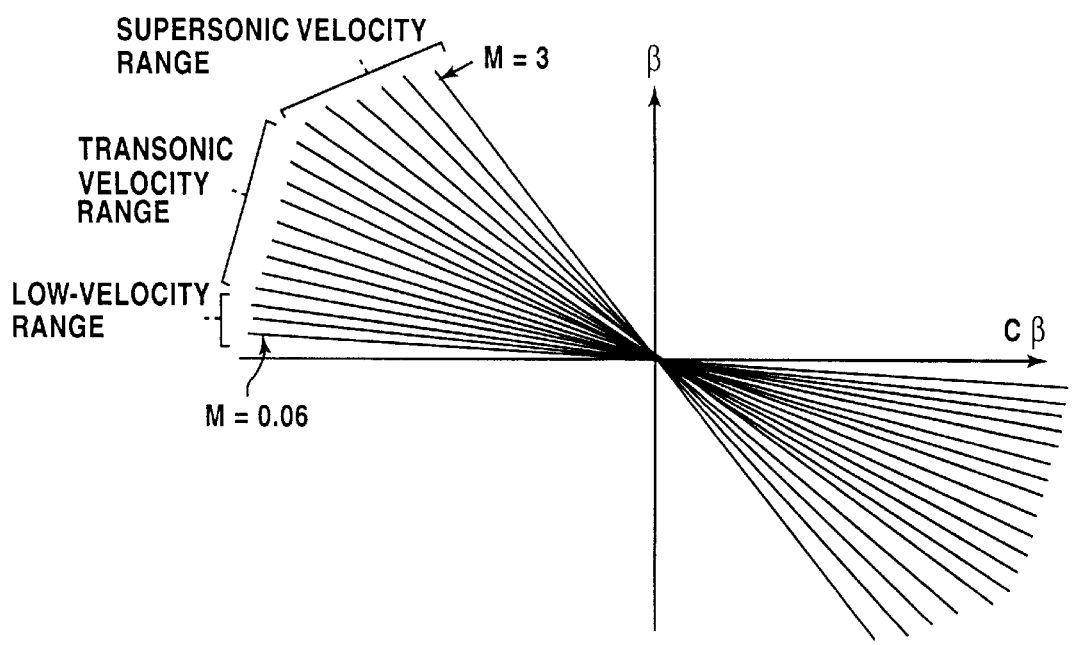

Next, the method of determining attack angle $\alpha$ and sideslip angle $\beta$ are described. Approximation equations that determines said attack angle $\alpha$ and said sideslip angle $\beta$ were made third-order equations (as in equations 5 and 6) concerning attack angle pressure coefficient C$\alpha$ and sideslip angle pressure coefficient C$\beta$, which are known quantities, and are expressed in the form of polynomial equations up to fifth order concerning Mach number M that are capable of instantly determining each of said coefficients, namely $A_0$, $A_1, A_2, A_3, B_0, B_1, B_2$, and $B_3$. Coefficient $A_{ij}$ concerning the polynomial equations concerning this Mach number M is the attack angle pressure calibration coefficient, and coefficient $B_{ij}$ is the sideslip angle pressure calibration coefficient. In advance of deciding these pressure calibration coefficients $A_{ij}$ and $B_{ij}$, relationship curves for attack angle pressure coefficient C$\alpha$ and sideslip angle pressure coefficient C$\beta$ and for real airflow attack angle $\alpha$ and real airflow sideslip angle $\beta$ are shown in FIG. 3, in which A indicates the relationship between attack angle pressure coefficient C$\alpha$ and real airflow attack angle $\alpha$, and B indicates the relationship between sideslip angle pressure coefficient C$\beta$ and real airflow sideslip angle $\beta$. As shown in FIG. 3, the graph of real airflow attack angle $\alpha$ and attack angle pressure coefficient C$\alpha$ for a given Mach number is expressed with a nearly straight line (i.e., a first-order equation). Similarly, the graph of real airflow sideslip angle $\beta$ and sideslip angle pressure coefficient C$\beta$ is essentially expressed with a nearly straight line (i.e., a first-order equation). However, because both cases actually diverge slightly from a straight line, in order to account for this effect, real airflow attack angle $\alpha$ is expressed with third-order equation 5 for attack angle pressure coefficient C$\alpha$ and real airflow sideslip angle $\beta$ with third-order equation 6 for sideslip angle pressure coefficient C$\alpha$. Furthermore, variation according to Mach number in the coefficient of each order of attack angle pressure coefficient C$\alpha$ (i.e., $A_0, A_1, A_2$, and $A_3$) and in the coefficient of each order of sideslip angle pressure coefficient C$\beta$ (i.e., $B_0, B_1$, $B_2$, and $B_3$) is respectively expressed as a polynomial equation up to fifth order for Mach number M.

$$\alpha=A_0+A_1C\alpha+A_2C\alpha^2+A_3C\alpha^3 \quad (5)$$

where $A_0=A_{00}+A_{01}M+A_{02}M^2+A_{03}M^3+A_{04}M^4+A_{05}M^5$
$A_1=A_{10}+A_{11}M+A_{12}M^2+A_{13}M^3+A_{14}M^4+A_{15}M^5$
$A_2=A_{20}+A_{21}M+A_{22}M^2+A_{23}M^3+A_{24}M^4+A_{25}M^5$ $$A_3 = A_{30} + A_{31}M + A_{32}M^2 + A_{33}M^3 + A_{34}M^4 + A_{35}M^5$$

$$\beta = B_0 + B_1 C\beta + B_2 C\beta^2 + B_3 C\beta^3 \quad (6)$$

where $B_0 = B_{00} + B_{01}M + B_{02}M^2 + B_{03}M^3 + B_{04}M^4 + B_{05}M^5$
$B_1 = B_{10} + B_{11} + M + B_{12}M^2 + B_{13}M^3 + B_{14}M^4 + B_{15}M^5$
$B_2 = B_{20} + B_{21}M + B_{22}M^2 + B_{23}M^3 + B_{24}M^4 + B_{25}M^5$
$B_3 = B_{30} + B_{31}M + B_{32}M^2 + B_{33}M^3 + B_{34}M^4 + B_{35}M^5$ Calibration coefficients $A_{ij}$ and $B_{ij}$ in the above equations are determined, as unknown quantities, by calculation using $C\alpha$ and $C\beta$ data obtained by substituting into equations 1 and 2 five items of pressure information (PH, Pb1, Pb2, Pb3, and Pb4) detected by the five-hole probe in said probe's axial directions ($\alpha$ and $\beta$) in prior wind tunnel testing at various Mach number settings, and by using said setting values (attack angle $\alpha$, sideslip angle $\beta$, and Mach number M) in equations 5 and 6. To ensure accuracy, however, large amounts of data are collected and processed with the least-square method and stored in advance in ROM or some other memory means as 4×6 matrix information corresponding to multiple velocity ranges.

The greatest characteristic of the present invention is that approximation equations to determine attack angle $\alpha$ and sideslip angle P are expressed as third-order equations concerning known numbers $C\alpha$ and $C\beta$ as equations 5 and 6, and, furthermore, the coefficients are expressed in the form of polynomial equations up to fifth order concerning Mach number M that are capable of instantly determining the Mach number M, namely $A_0, A_1, A_2, A_3, B_0, B_1, B_2,$ and $B_3$. Therefore, coefficient calculations in equations up to fifth order and calculation of attack angle $\alpha$ and sideslip angle $\beta$ in third-order equations can be carried out immediately based on known numbers, without the need to solve third-order equations as is done conventionally, and Mach number can be instantly determined, thus enabling real time response in operation control in aircraft.

Calculation of actual attack angle $\alpha$ and sideslip angle $\beta$ during flight is carried out as secondary arithmetic processing. Specifically, the present invention determines attack angle $\alpha$ and sideslip angle $\beta$ arithmetically according to, respectively, arithmetic processing equation 5, said equation being a polynomial approximation equation that expresses the relationship of the value of attack angle $\alpha$ to be determined (said value being an unknown quantity) to the aforesaid Mach number M determined by a lookup table stored in a memory, an attack angle pressure calibration coefficient $A_{ij}$ corresponding to attack angle $\alpha$ also stored in the memory, and the attack angle pressure coefficient $C\alpha$ obtained with primary arithmetic processing; and according to arithmetic processing equation 6, said equation being a polynomial approximation equation that similarly expresses the relationship of the value of sideslip angle $\beta$ to be determined (said value being an unknown quantity) to Mach number M, a sideslip angle pressure calibration coefficient $B_{ij}$ stored in the memory, and the sideslip angle pressure coefficient $C\beta$ obtained with primary arithmetic processing. By the foregoing, a flight velocity vector (M, $\alpha$, and $\beta$) can be determined. The foregoing is the secondary arithmetic processing and is carried out by a secondary arithmetic processing unit 22, indicated by broken line in FIG. 1.

Next, based on the Mach number M determined by the aforesaid lookup table and on the detected total pressure PH, a static pressure p corresponding to altitude information and a dynamic pressure q corresponding to velocity information are calculated in tertiary arithmetic processing. Said arithmetic employs different arithmetic equations for a low-velocity range that does not require addressing of compression; for a transonic velocity range that addresses the influence of compression, which cease to be negligible as the speed of sound is approached; and for a supersonic velocity range that requires addressing of the shock wave surfaces that arise immediately ahead of the probe. Static pressure P and dynamic pressure q can be determined arithmetically by a tertiary processing unit 23, indicated by broken line in FIG. 1, by selecting the equation corresponding to the Mach number M that is determined by the lookup table from among the arithmetic processing equations corresponding to Mach number M, specifically, static pressure calculation equations 7-1, 8-1, and 9-1 and dynamic pressure calculation equations 7-2, 8-2, and 9-2.

(a) $M \leq 0.2$: Low-velocity range $$p = PH(1 + 0.2M^2)^{-7/2} \quad (7\text{-}1)$$

$$q = PH\{1 - (1 + 0.2M^2)^{-7/2}\} \quad (7\text{-}2)$$

(b) $0.2 < M < 1$: Transonic velocity range $$p = PH(1 + 0.2M^2)^{-7/2} \quad (8\text{-}1)$$

$$q = PH\{0.7M^2 - (1 + 0.2M^2)^{-7/2}\} \quad (8\text{-}2)$$

(c) $M \geq 1$: Supersonic velocity range $$p = PH(1.2M^2)^{-7/2}\{6/(7M^2 - 1)\}^{-5/2} \quad (9\text{-}1)$$

$$q = PH*0.7M^2(1.2M^2)^{-7/2}\{6/(7M^2 - 1)\}^{-5/2} \quad (9\text{-}2)$$

With the foregoing arithmetic, measurement of flight velocity vector, static pressure (i.e., altitude information), and dynamic pressure can be carried out accurately and with a high update rate and, through an interface 26, are sent to a display apparatus, flight control apparatus, and the like 3. The present invention, by employing and systematizing such an arithmetic method, is capable of real time response as required for a detection unit in a flight control apparatus.

EXAMPLE

Next, more-concretized embodiments of the present invention are described. The Mach number calculation lookup table that is incorporated into the wide velocity range flight velocity vector measurement system is prepared with data obtained in advance in wind tunnel testing wherein the five-hole probe that concerns the present invention is placed in a wind tunnel at various airflow angles and wherein a wide range of airspeed conditions are established. The table that comprises the present embodiment is basically similar to conventional lookup tables as shown in FIG. 5 to the extent that, at points on an orthogonal coordinate system of Mach pressure coefficient CM and angle to airflow pressure coefficient C$\gamma$ where the corresponding Mach pressure coefficient CM intersects angle to airflow pressure coefficient C$\gamma$, values of Mach number M at those times are plotted. However, [the table that comprises the present invention], rather than taking Mach number M data at each intersection of a predetermined Mach pressure coefficient CM and a predetermined angle to airflow pressure coefficient C$\gamma$, retrieves Mach number M data at each intersection of an angle $\gamma$ formed between the probe axis and airflow axis and a predetermined value of Mach pressure coefficient CM as in FIG. 2. As shown in the drawing, the relationship between Mach pressure coefficient CM and angle to airflow pressure coefficient C$\gamma$ has linear properties such that, when airflow angle $\gamma$ is constant, an incline angle responsive to airflow angle $\gamma$ and passing through the origin [of the aforesaid coordinate system] exists. Because the lookup table that comprises the present embodiment thus retrieves Mach number M data at each intersection of airflow angle γ and a predetermined value of Mach pressure coefficient CM, the lattice region of said table comprises uneven, diamond-shape rectangles rather than conventional even rectangle shapes. Retrieving data by means of such a lattice form naturally responds to the desire to retrieve data densely in a low-velocity range but more sparsely and broadly at increasingly greater velocities. Furthermore, the ability to obtain a single, continuous table for velocities encompassing a wide range eliminates the need for the conventional, troublesome work of preparing a different table for each region, selecting from among said tables, and harmonizing boundary data.

In addition, the present invention requires the prior accumulation and storage in memory of data comprising the attack angle calibration coefficient "$A_{ij}$" and sideslip angle pressure calibration coefficient "$B_{ij}$" that are arithmetically needed when determining attack angle α and sideslip angle β, entailing the obtaining of said data in advance through prior wind tunnel testing. These calibration coefficients are coefficients comprising equations up to fifth order concerning the Mach number M used to calculate the coefficients of above-mentioned equations 5 and 6 and are 4×6 matrix information the appropriate values of which are determined using the least-square method after being calculated as the unknown quantities in equations 5 and 6 using an attack angle α and sideslip angle β established through prior wind tunnel testing as stated above, a Mach number M similarly established, and Cα and Cβ obtained by substituting into equations 1 and 2 five items of pressure information detected at that time by the five-hole probe. The actual calculations, although quite troublesome, are not, unlike measurement while in flight, required to be processed in real time, and so adequate time can be spent on the calculations In advance. These calibration coefficients influence the accuracy of calculation of attack angle α and sideslip angle β and so, when an angular precision of 0.1° or less is required, necessitate obtaining in advance data for finely divided regions. If accuracy of approximately 0.3° to 0.5° is sufficient, then no problems are posed by using the same calibration coefficient data for all velocity regions. Generally, it is appropriate to store data for three to six velocity regions. When dividing velocities into a large number of regions, it is logical to divide those regions requiring [greater] accuracy finely and prepare data in advance for those regions.

Figure 4:
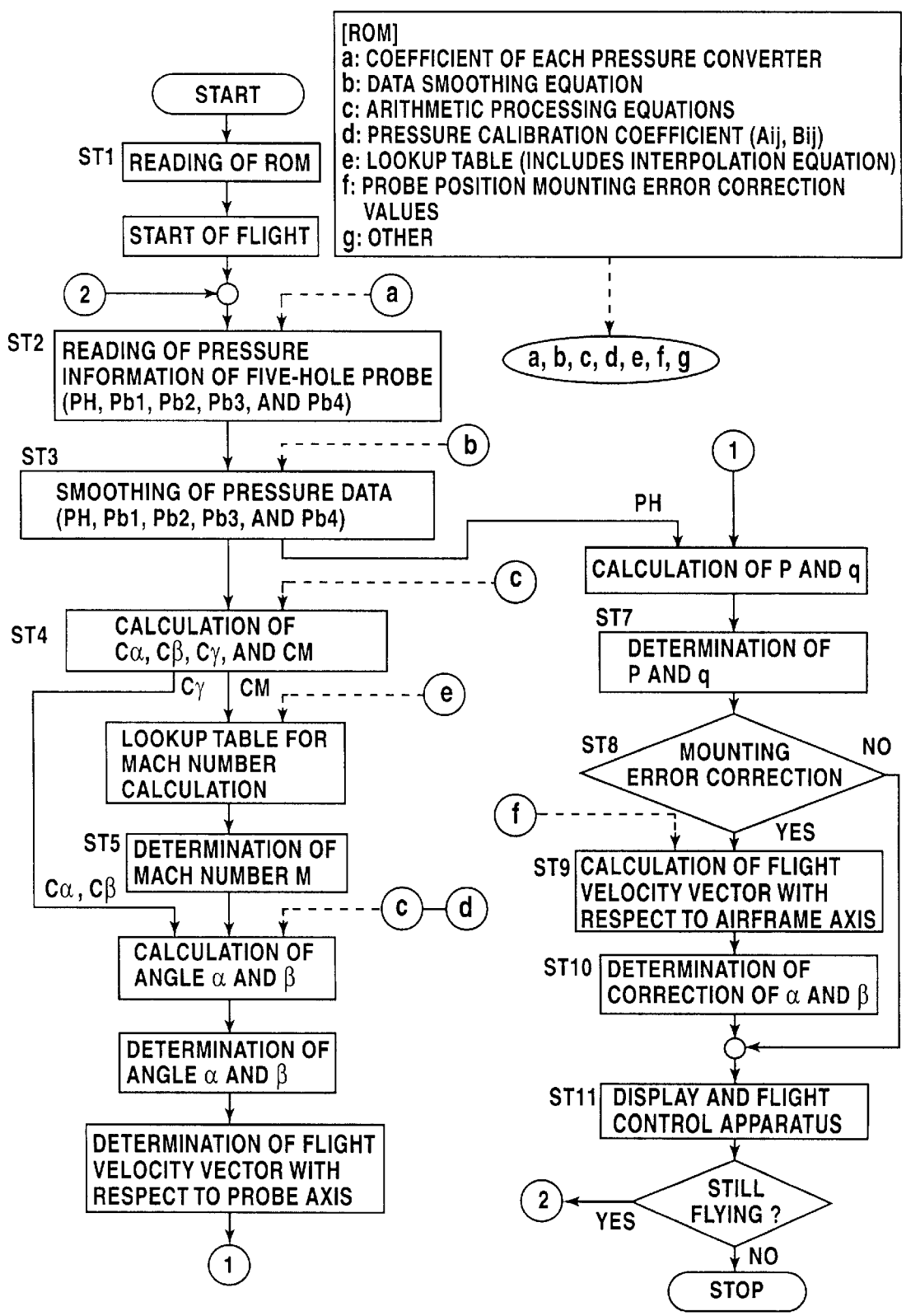
FIG. 4 is a simplified flowchart of flight velocity vector measurement.

In the present embodiment, data comprising the aforesaid Mach number calculation lookup table, attack angle pressure calibration coefficient "$A_{ij}$", and sideslip angle pressure calibration coefficient "$B_{ij}$" are stored in advance in the ROM of the arithmetic processor 2 or in some other memory means. The aforesaid memory means is also for storing the coefficients of each pressure converter, data smoothing equations, various arithmetic processing equations, probe position mounting error correction values, and other information. The arithmetic processing operations of the present embodiment are described below in keeping with the flowchart in FIG. 4.

At start, the switch is moved to the ON position, whereupon in step 1 (indicated in the drawing as "ST1") the necessary information in the ROM is read in to the RAM (i.e., work area) and the standby state is entered. The reason that stored information in the ROM is read out to the RAM that serves as the work area is so that arithmetic operations performed at each step can be performed speedily, as work within the work area, without having to retrieve the necessary information from the ROM each time. Once flight begins, pressure information detected by the five-hole probe in step 2 is loaded and converted by the pressure converter to an electric signal (i.e., a voltage value), a characteristic coefficient of said converter stored in the ROM being used to effect said conversion. Five items of pressure information (PH, Pb1, Pb2, Pb3, Pb4) are smoothed in step 3, the arithmetic processing of said smoothing being carried out according to a data smoothing equation read out from the ROM to the RAM. From said smoothed pressure data, in step 4 attack angle pressure coefficient Cα is calculated with arithmetic equation 1; sideslip angle pressure coefficient Cβ, with arithmetic equation 2; angle to airflow pressure coefficient Cγ, with arithmetic equation 3; and Mach pressure coefficient CM, with arithmetic equation 4, said arithmetic equations being originally stored in the ROM but having been read out to the RAM (work area) in step 1. Once each pressure coefficient is arrived at, Mach number M is determined in step 5 using the aforesaid lookup table. The lookup table of the present embodiment, as stated above, retrieves Mach number M data for each intersection of predetermined airflow angle γ and predetermined Mach pressure coefficient CM, and so the lattice region comprises uneven, diamond-shape rectangles rather than even rectangle shapes. When the specified angle to airflow pressure coefficient value Cγ and Mach pressure coefficient value CM correspond to an intersection on the table, then the corresponding Mach number has only to be read out directly. Generally, however, [CM and Cγ] will correspond to coordinate points in an aforesaid diamond-shape region, in which case Mach number M is calculated by performing bilinear interpolation from the Mach numbers of the four corners. The interpolation equation used at such time is stored in advance in memory means along with the lookup table. Next, in step 6, arithmetic operations with attack angle α and sideslip angle β are performed. Said arithmetic operations are carried out by applying the data of attack angle pressure calibration coefficient "$A_{ij}$" and sideslip angle pressure calibration coefficient "$B_{ij}$" stored in matrix form, the Mach number value M determined earlier, attack angle pressure coefficient Cα, and sideslip angle pressure coefficient Cβ into equations 5 and 6 also stored in memory. In advance of said arithmetic operations, first, a data table of angle pressure calibration coefficients "$A_{ij}$" and "$B_{ij}$" corresponding to the value of Mach number M is selected. Coefficient calculations employ equations up to fifth order concerning Mach number M; arithmetic equations 5 and 6, third-order equations concerning attack angle pressure coefficient Cα and sideslip angle pressure coefficient Cβ. However, said polynomial equation operations do not entail solving equations but rather are simple calculations wherein known values are substituted [into said equations], and so are not time-consuming and can be carried out immediately. The foregoing arithmetic processing yields a flight velocity vector (M, α, and β) with respect to probe axis.

In step 7, static pressure p and dynamic pressure q are calculated through arithmetic operations wherein the smoothed total PH obtained in step 3 and the Mach number M determined in step 5 are substituted into arithmetic equations. Said arithmetic equations are multiple equations prepared in advance in response to flight velocity region and comprise static pressure calculation equations 7-1, 8-1, and 9-1 and dynamic pressure calculation equations 7-2, 8-2, and 9-2. In advance of arithmetic operations, an arithmetic equation in response to the value of Mach number M is first selected and specified; arithmetic operations are carried out based thereon. In step 8, a verification to determine whether the five-hole probe agrees with the airframe axis is carried out. If deviation exists in mounting of the five-hole probe, then a correction value in response to five-hole probe position mounting error is stored in memory in advance is in Step 9 read out to arithmetically correct, and then calculate, flight velocity (Mach number M) with respect to airframe axis. Subsequently, in step 10, attack angle α and sideslip angle β are corrected by correcting for the error component therein. In step 11, the obtained values are sent as measurement signals to a display apparatus and flight control apparatus. If in step 8 the five-hole probe is deemed to be in agreement with the airframe axis, the correction in steps 9 and 10 is unnecessary, and so the values obtained up to step 7 are used without modification to proceed to step 11. After the values are transmitted in step 11, a verification to determine whether the aircraft is still flying is carried out in step 12. If the aircraft is still flying, the flow returns to step 2, arithmetic operations are carried out based on new detection information, and the data are updated. If flight has ended, the flow stops at step 12 and work is terminated. By eliminating the solving of polynomial equations, the foregoing measurement arithmetic operations flow makes possible high-speed processing and is able to support the high update rates required for flight control.

What is claimed is:

1. A method for arithmetically processing flight velocity vector measurement values carried out in a wide velocity range flight velocity vector measurement system that uses a square truncated triangle-shape five-hole Pitot probe, comprising the steps of:

obtaining, by arithmetic processing, airflow attack angle coefficient Cα, which is obtainable from five items of pressure information detected by said five-hole probe by nondimensionalizing a pressure difference of vertical pressure holes by total pressure, airflow sideslip angle pressure coefficient Cβ, which is obtainable by nondimensionalizing a pressure difference of horizontal pressure holes by total pressure, angle to airflow pressure coefficient Cγ, which is the square root of the sum of the respective squares of said Cα and Cβ, and Mach pressure coefficient CM, which is obtained by nondimensionalizing, by total pressure, a pressure difference between said total pressure and a average pressure of four holes in a square truncated pyramid surfaces;

determining the current Mach number M by applying, into a Mach number calculation lookup table that stores in advance in an arithmetic processor Mach numbers M corresponding to planar coordinates of angle to airflow pressure coefficient Cγ and mach pressure coefficient CM over a wide velocity range, said calculated Cγ value and calculated CM value; and determining arithmetically attack angle α and sideslip angle β by applying said calculated Cα value and calculated Cβ value and pressure calibration coefficients stored in advance in said arithmetic processor into a high-order approximation equation concerning attack angle pressure coefficient Cα that determines attack angle α and a high-order approximation equation concerning sideslip angle pressure coefficient Cβ that determines sideslip angle β.

2. A method for arithmetically processing flight velocity vector measurement values recited in claim 1 wherein said high-order approximation equation concerning attack angle pressure coefficient Cα that determines attack angle α and a high-order approximation equation concerning sideslip angle pressure coefficient Cβ that determines sideslip angle β are:

$$\alpha = A_0 + A_1 C\alpha + A_2 C\alpha^2 + A_3 C\alpha^3$$

where $$A_0 = A_{00} + A_{01}M + A_{02}M^2 + A_{03}M^3 + A_{04}M^4 + A_{05}M^5$$
$$A_1 = A_{10} + A_{11}M + A_{12}M^2 + A_{13}M^3 + A_{14}M^4 + A_{15}M^5$$
$$A_2 = A_{20} + A_{21}M + A_{22}M^2 + A_{23}M^3 + A_{24}M^4 + A_{26}M^5$$
$$A_3 = A_{30} + A_{31}M + A_{32}M^2 + A_{33}M^3 + A_{34}M^4 + A_{35}M^5$$

and $$\beta = B_0 + B_1 C\beta + B_2 C\beta + B_3 C\beta^3$$

where $$B_0 = B_{00} + B_{01}M + B_{02}M^2 + B_{03}M^3 + B_{04}M^4 + B_{05}M^5$$
$$B_1 = B_{10} + B_{11}M + B_{12}M^2 + B_{13}M^3 + B_{14}M^4 + B_{15}M^5$$
$$B_2 = B_{20} + B_{21}M + B_{22}M^2 + B_{23}M^3 + B_{24}M + B_{26}M^5$$
$$B_3 = B_{30} + B_{31}M + B_3M + B_{33}M + B_{34}M^4 + B_{35}M^5,$$

respectively, and pressure calibration coefficients "$A_{ij}$" and "$B_{ij}$" are calculated as unknown quantities by applying attack angle α, established through prior wind tunnel testing; Mach number M, similarly established; and calculated Cα and Cβ into said high-order approximation equations.

3. An arithmetic processing method for arithmetically processing flight velocity vector measurement values carried out in a wide flight velocity range flight velocity vector measurement system using a square truncated pyramid-shape five-hole Pitot probe, comprising the steps of:

obtaining, by arithmetic processing, airflow attack angle coefficient Cα, which is obtainable from five items of pressure information detected by said five-hole probe by nondimensionalizing a pressure difference of vertical pressure holes by total pressure, airflow sideslip angle pressure coefficient Cβ, which is obtainable by nondimensionalizing a pressure difference of horizontal pressure holes by total pressure, angle to airflow pressure coefficient Cγ, which is the square root of the sum of the respective squares of said Cα and Cβ, and Mach pressure coefficient CM, which is obtained by nondimensionalizing, by the total pressure, a pressure difference between said total pressure and a average pressure of four holes in a square truncated pyramid surfaces; and determining a current Mach number M by applying, into a Mach number calculation lookup table that stores in advance in an arithmetic processor Mach numbers M corresponding to planar coordinates of angle to airflow pressure coefficient Cγ and mach pressure coefficient CM over a wide velocity range, the aforesaid calculated Cγ value and calculated CM value;

wherein said Mach number calculation lookup table stores Mach number M data for each intersection between a predetermined airflow angle γ value and a predetermined Mach pressure coefficient CM value on a planar coordinate system of angle to airflow pressure coefficient Cγ and Mach pressure coefficient CM.

4. A method for arithmetically processing flight velocity vector measurement values recited in claim 1 whereby, in the event that, during Mach number M determination, the calculated Cγ value and calculated CM value Mach number M do not correspond to the intersection of predetermined values on a Mach number calculation lookup table, Mach number M is calculated by bilinear interpolation from the Mach number values of the four corners of a diamond-shape lattice region where said calculated values are present.

5. An arithmetic processing apparatus of a wide velocity range flight velocity vector measurement system using a square truncated pyramid-shape five-hole Pitot probe, comprising:

a primary arithmetic processing unit that, receiving five items of pressure information detected by said five-hole probe, obtains airflow attack angle coefficient $C\alpha$, which is obtainable by nondimensionalizing a pressure difference of vertical pressure holes by total pressure, airflow sideslip angle pressure coefficient $C\beta$, which is obtainable by nondimensionalizing a pressure difference of horizontal pressure holes by total pressure, angle to airflow pressure coefficient $C\gamma$, which is obtained by taking the square root of the sum of the respective squares of said $C\alpha$ and $C\beta$, and Mach pressure coefficient CM, which is obtained by nondimensionalizing, by total pressure, a pressure difference between said total pressure and the average pressure of four holes in the square truncated pyramid surfaces;

a secondary arithmetic processing unit containing: means for determining the current Mach number M by applying, into a Mach number calculation lookup table that stores in advance in memory means Mach numbers M corresponding to planar coordinates of angle to airflow pressure coefficient $C\gamma$ and mach pressure coefficient CM over a wide velocity range, said calculated $C\gamma$ value and calculated CM value; and arithmetic means for determining attack angle $\alpha$ and sideslip angle $\beta$ by applying said calculated $C\alpha$ value and calculated $C\beta$ value and pressure calibration coefficients determined and stored in advance in said memory means into a high-order approximation equation concerning attack angle pressure coefficient $C\alpha$ that determines attack angle $\alpha$ and a high-order approximation equation concerning sideslip angle pressure coefficient $C\beta$ that determines sideslip angle $\beta$; and a tertiary arithmetic processing unit that receives a total pressure PH value from the primary arithmetic processing unit and a Mach number M value from the secondary arithmetic processing unit and calculates static pressure p and dynamic pressure q, and being an arithmetic processing method in a wide velocity range flight velocity vector measurement system that sends calculated data to a display apparatus and a flight control apparatus.

\* \* \* \* \*